(12) United States Patent
Janecke et al.

(10) Patent No.: US 6,893,378 B2
(45) Date of Patent: May 17, 2005

(54) TRANSMISSION SYSTEM AND METHOD OF OPERATION TO ACCOMMODATE ENGAGEMENT OF CENTRIFUGAL CLUTCH

(75) Inventors: Daniel P. Janecke, Kalamazoo, MI (US); Donald D. Teadt, Vicksburg, MI (US); Daniel L. Pesce, Mt. Juliet, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/440,584

(22) Filed: May 19, 2003

(65) Prior Publication Data

US 2004/0235616 A1 Nov. 25, 2004

(51) Int. Cl.[7] ............................................. F16H 61/16
(52) U.S. Cl. ........................................ 477/125; 477/906
(58) Field of Search ............................... 477/70, 78, 79, 477/75, 80, 118, 121, 125, 906; 192/3.63, 103 R, 105 CP (56) References Cited

U.S. PATENT DOCUMENTS

| | | | | |
|---|---|---|---|---|
| 4,499,793 A | * | 2/1985 | Jow et al. | 477/78 |
| 4,640,393 A | * | 2/1987 | Nishimura et al. | 477/70 |
| 5,191,814 A | * | 3/1993 | Ando et al. | 477/78 |
| 6,058,346 A | * | 5/2000 | Wachi et al. | 477/906 |
| 6,702,713 B2 | * | 3/2004 | Edelen et al. | 477/78 |

FOREIGN PATENT DOCUMENTS

| | | | | |
|---|---|---|---|---|
| JP | 363072955 | * | 2/1988 | F16H/5/66 |
| JP | 01288535 | * | 3/2003 | F16H/61/28 |

* cited by examiner

*Primary Examiner*—Sherry Estremsky
(74) *Attorney, Agent, or Firm*—Rader, Fishman & Grauer PLLC

(57) ABSTRACT

A vehicular transmission system is disclosed that includes a prime mover, a transmission having at least one mode of operation where the transmission is selectively shifted into a lower gear ratio as vehicle speed decreases, a master friction clutch for drivingly connecting the prime mover to the transmission, and at least one control unit. The control unit includes logic rules that selectively prohibit the transmission from being shifted into a lower gear ratio in response to a system operating condition during the at least one mode of operation. The system also includes at least one input corresponding to a system operating condition and at least one output corresponding to a command to prohibit the transmission from being shifted into a lower gear ratio in response to the sensed system operating condition. A control system and method for operating the vehicular transmission system are also disclosed.

15 Claims, 8 Drawing Sheets

TRANSMISSION SYSTEM AND METHOD OF OPERATION TO ACCOMMODATE ENGAGEMENT OF CENTRIFUGAL CLUTCH

BACKGROUND OF THE INVENTION

1. Field of the Invention

The present invention relates to a vehicular transmission system including a master friction clutch and, in particular, to a vehicular transmission system and method of operation to accommodate clutch failure.

2. Description of the Related Art

Centrifugally operated friction clutches are well known in the art and typically include a driving input member driven by a prime mover, usually an internal combustion engine, and weights rotatable with the driving member which, upon rotation of the driving member, will move radially outwardly under the effect of centrifugal force to cause the driving input member to frictionally engage a driven output member. Examples of centrifugally operated clutches may be seen by reference to U.S. Pat. Nos. 3,580,372; 3,580,372; 3,696,901; 5,437,356; 3,810,533; 4,819,779; 5,441,137; 5,730,269 and 4,610,343, the disclosures of which are incorporated herein by reference.

Vehicular transmission systems that employ a centrifugal master friction clutch for drivingly connecting an internal combustion engine to a multiple ratio transmission are also known in the art. When mated to an internal combustion engine, centrifugal clutches are engaged and disengage as a function of engine speed, requiring manipulation of engine speed to selectively engage and disengage the clutch. Vehicular transmission systems, especially for heavy-duty vehicles, may be configured to automatically shift the transmission from neutral into a low gear ratio, such as the starting gear, as the vehicle slows toward rest in what is commonly referred to as a "coast mode" of operation. To engage a low gear ratio during the "coast mode," the engine speed must be slow enough to allow the centrifugal clutch to disengage.

However, failure of the clutch to disengage as the engine speed decreases permits the engine to transfer power through the clutch and into the transmission after the transmission is shifted from neutral into a low gear ratio. The clutch may fail to disengage for several reasons, including without limitation, damage of a clutch component that renders the centrifugal mechanism inoperable and/or failure of the engine speed to decrease below the speed that permits clutch disengagement. Under these circumstances, the vehicle operator may notice the engine begin to pull against the application of the vehicle service brakes as the vehicle is slowed. With increased brake application, the engine torque may disengage the clutch or stall the engine as the vehicle slows toward rest.

For these and other reasons, it is desirable to provide an improved approach for operating a vehicular transmission system, particularly those that employ a centrifugal master friction clutch, to reduce or minimize the known limitations of the prior art.

SUMMARY OF THE INVENTION

A vehicular transmission system is disclosed that includes a prime mover, a transmission having at least one mode of operation where the transmission is selectively shifted into a lower gear ratio as vehicle speed decreases, a master friction clutch for drivingly connecting the prime mover to the transmission, and at least one control unit. The control unit includes logic rules that selectively prohibit the transmission from being shifted into a lower gear ratio in response to a system operating condition during the at least one mode of operation. The system also includes at least one input corresponding to a system operating condition and at least one output corresponding to a command to prohibit the transmission from being shifted into a lower gear ratio in response to the sensed system operating condition. A control system and method for operating the vehicular transmission system are also disclosed.

BRIEF DESCRIPTION OF THE DRAWINGS

Embodiments of the invention will now be described, by way of example, with reference to the accompanying drawings, wherein.

DETAILED DESCRIPTION

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms or configurations shown in the drawings and disclosed in the following detailed description.

Figure 1:
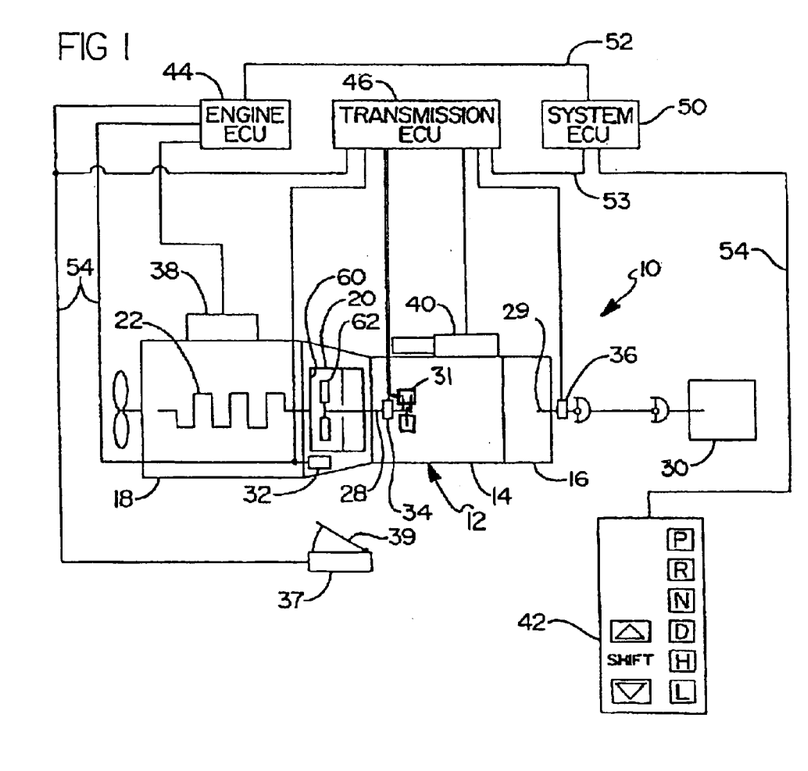
FIG. 1 is a schematic illustration of an exemplary vehicular transmission system employing the control system and method of the present invention.

An exemplary vehicular transmission system 10 using a centrifugally operated friction master clutch is schematically illustrated in FIG. 1. System 10 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735,771; and 6,015,366. The embodiment of vehicular transmission system 10 illustrated in FIG. 1 is provided by way of example only and is not intended to limit the scope of the claimed invention.

In the exemplary system 10, a change-gear transmission 12 including a main transmission section 14 connected in series with a splitter-type auxiliary transmission section 16 is drivingly connected to a prime mover 18, such as a well-known gasoline or diesel internal combustion engine, by a centrifugal master friction clutch 20. Transmissions 12, by way of example, may be of the type well known in the prior art and are sold by the assignee of this application, EATON CORPORATION, under the trademarks "Super-10" and "Lightning," and may be seen in greater detail by reference to U.S. Pat. Nos. 4,754,665; 6,015,366; 5,370,013; 5,974,906 and 5,974,354, the disclosures of which are incorporated herein by reference.

In an embodiment of the invention, prime mover 18 functions as an engine that includes a crankshaft 22, which is attached to a driving member 60 of centrifugal clutch 20. The driving member 60 frictionally engages with, and disengages from, a driven member 62, which is attached to the input shaft 28 of the transmission. A transmission output shaft 29 extends from the auxiliary transmission section 16 for driving connection to the vehicular drive wheels, as through a drive axle 30 or transfer case.

An inertia brake 31 (also known as an input shaft brake) may be used for selectively decelerating the rotational speed of the input shaft 28. During launch of a vehicle employing system 10, inertia brake 31 is activated to synchronize the speed of the input shaft 28 with the speed of output shaft 29, which is typically at rest when engagement of a starting gear ratio is attempted. Suitable inertia brakes for use in system 10 may be seen by reference to U.S. Pat. Nos. 5,655,407 and 5,713,445; however, inertia brake 31 is not intended to be limited thereto.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 20 requires no external clutch actuator and is operated as function of the rotational speed (ES) of the engine. Centrifugal clutch 20 also requires no connections to operating linkages, command signal inputs, power electronics and/or compressed air and/or hydraulic conduits. The most economical application of the present invention is with a dry clutch, however, the present invention is also applicable to wet clutch technology.

The exemplary system 10 may also include rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of the position of throttle pedal 39 or of torque demand. The signal is commonly expressed as a percentage (0% to 100%) of full throttle position. In an embodiment, engine 18 includes an electronically responsive engine controller 38.

An X-Y shift actuator 40, which by way of example may be of the types illustrated in U.S. Pat. Nos. 5,481,170; 5,281,902; 4,899,609 and 4,821,590, may be provided for automated or shift-by-wire shifting of the transmission main section 14 and/or auxiliary section 16. One exemplary actuator has a pair of electrically operated motors or servos which shift the transmission through a mechanical interface. In an particular embodiment, a shift selector 42 allows the vehicle driver to select a mode of operation and provides a signal $GR_T$ indicative of the gear ratio of the desired gear, or a Target Gear Ratio. The shift selector 42 shown in FIG. 1 has a plurality of gear range buttons which can be selected by the vehicle operator. Shift selector 42 could alternatively take other forms not illustrated, such as a shift lever having a shift knob. The lever could also be toggled between positions corresponding to gear ranges.

Engine controller 38 and X-Y shift actuator 40 communicate through the system 10 via an engine control unit 44, a transmission control unit 46 and a system control unit 50 (each shown in FIG. 1 as an electronic control unit or ECU). Engine ECU 44 and system ECU 50 communicate with each other over a first multiplexed data bus 52 employing an appropriate communications protocol such as SAE J-1922, SAE J-1939, ISO 11898 or the like. Transmission ECU 46 and system ECU 50 similarly communicate with each other over a second multiplexed data bus 53. It will be appreciated that two or more of ECUs 44, 46 and 50 may be combined into a single ECU or control unit. Similarly, ECU's 44 and 46 may be combined with engine controller 38 and transmission controller 38, respectively.

ECUs 44, 46 and 50 are preferably a microprocessor-based control unit of the type illustrated in U.S. Pat. Nos. 4,595,986 and 4,361,065, the disclosures of which are incorporated herein by reference. ECUs 44, 46, 50 receive at least one input, such as an electronic signal, from throttle position sensor 50, speed sensors 32, 34 and 36 over conventional electrical signal and power conducting elements 54 such as wires. ECUs 44, 46, 50 process such signals according to predetermined logic rules to produce an output, such as an electronic signal, to system actuators, including without limitation, engine controller 38 and shift actuator 40, over conducting elements 54. ECUs 44, 46, 50 may also direct each other to issue command signals. The communications protocol may establish a priority of such commands. The ECUs store control logic for controlling the engine, the transmission and the clutch. Details of the control logic will be discussed in detail below.

The structure of an exemplary centrifugal clutch may be seen by reference to FIGS. 3–6. In the illustrated embodiment, clutch 20 includes a cover assembly 100, friction disc assembly 102, intermediate pressure plate 104, and friction disc assembly 106. Cover assembly 100 and intermediate pressure plate 104 mount to the engine flywheel for rotation therewith and comprise the driving portion 60 of the clutch, while friction disc assemblies 102 and 106 are typically splined to transmission input shaft 28 and comprise the driven portion 62 of the clutch.

Portion 20A of clutch 20 may be substantially similar, both structurally and functionally, to existing dual plate clutches. In an exemplary embodiment, the cover assembly 100 includes four flyweights 110, which are secured to the housing assembly at pivot pins 112. Return springs 114 bias the flyweights 110 radially inwardly to rest on stops 116 (see, e.g., FIG. 5A). A stop member 118 limits the radially outward movement of the flyweights (see, e.g., FIG. 5B). As the engine and the cover assembly 100 rotate, the effect of centrifugal force will cause the flyweights 110 to move against the bias of springs 114 from the position of FIG. 5A to the position of FIG. 5B. The flyweights 110 each carry one or more roller 120 or functionally similar wedging member, which will act between a reaction surface and a ramp to provide an axial clamping force for engaging clutch 20.

Figure 6:
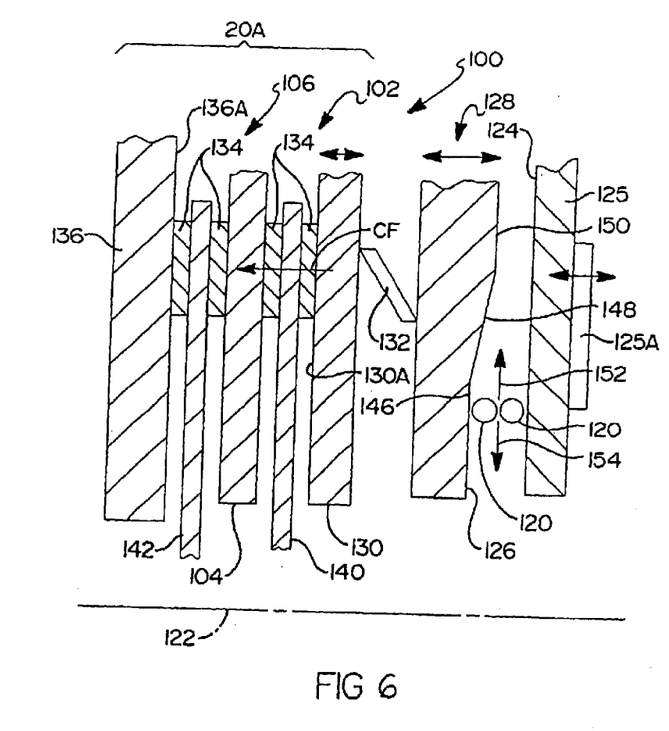
FIG. 6 is a schematic partial sectional view of various components of the exemplary vehicular transmission system of FIG. 1.

Referring to FIG. 6, the components of clutch 20 are shown in cross-sectional fragments as rotating about the rotational axis 122 of input shaft 28. Rollers 120 are received between a substantially flat surface 124 of a fixed reaction plate 125 and a ramped surface 126 of an axially movable ramp plate 128. Alternatively, surface 124 could be ramped and/or the wedging member could be of a wedge configuration. The reaction plate 125 may be manually and/or automatically adjustable by an adjustment mechanism 125A to take up wear or the like. The ramp plate acts on an axially movable main pressure plate 130 through a preloaded spring member 132, which will limit the axial force applied to the main pressure plate 130 by the ramp plate. Main pressure plate 130 will apply a clamping force (CF) on the friction pads 134 of the friction plates which are trapped between surface 130A of the main pressure plate 130 and the intermediate pressure plate 104 and the intermediate pressure plate 104 and surface 136A of the engine flywheel 136. The hub portions 140 and 142 of the friction plates 102 and 106, respectively, are adapted to be splined to input shaft 28 for rotation therewith while plates 125, 128, 130, and 104 rotate with the engine flywheel 136.

Figure 2:
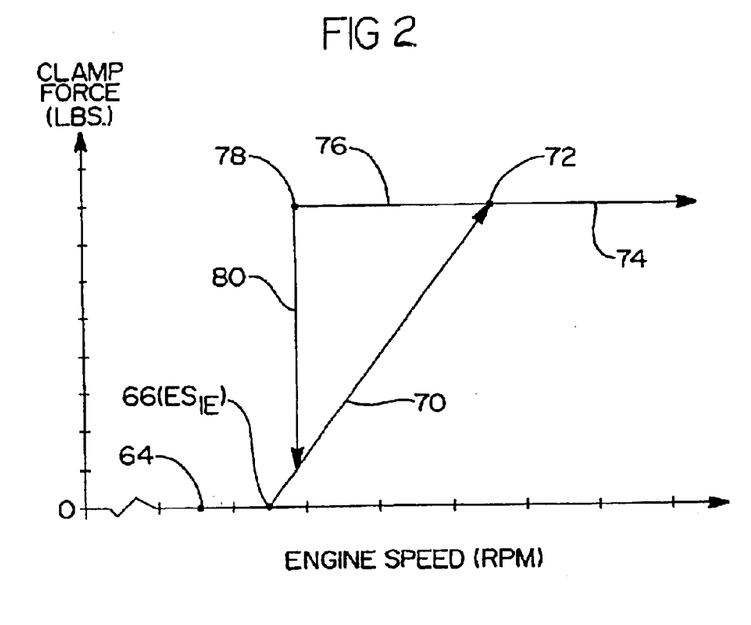
FIG. 2 is an schematic illustration, in graphical format, of illustrative clamp force characteristics of a centrifugal clutch at various engine speeds.
Figure 3:
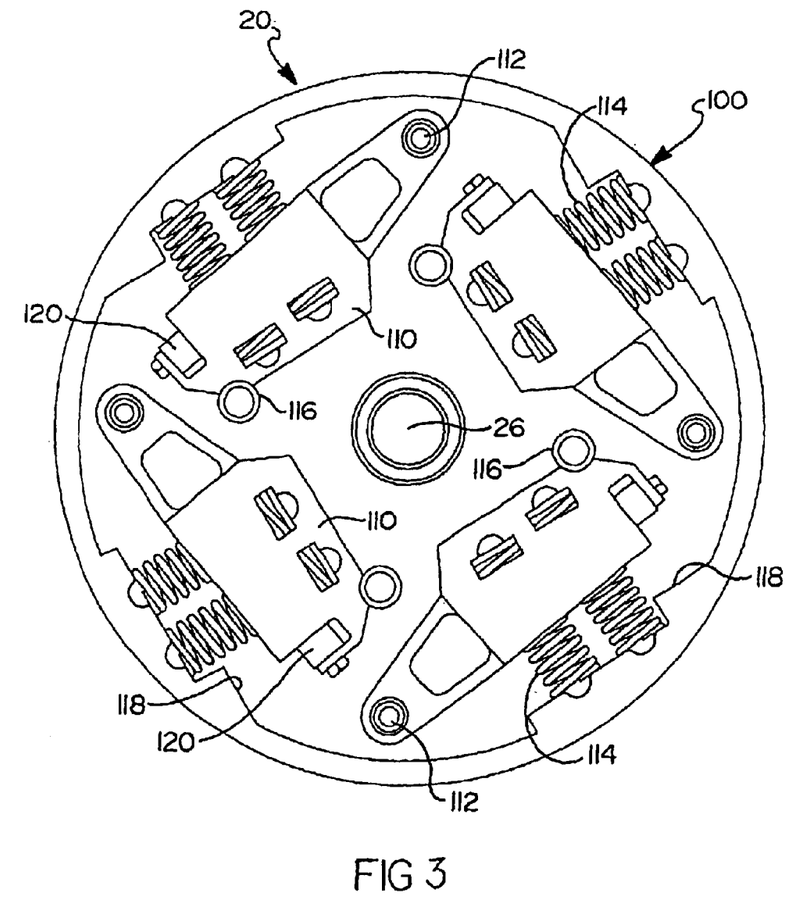
FIG. 3 is a partial top view, in section, of the cover and centrifugal mechanism of an exemplary centrifugal clutch.
Figure 4:
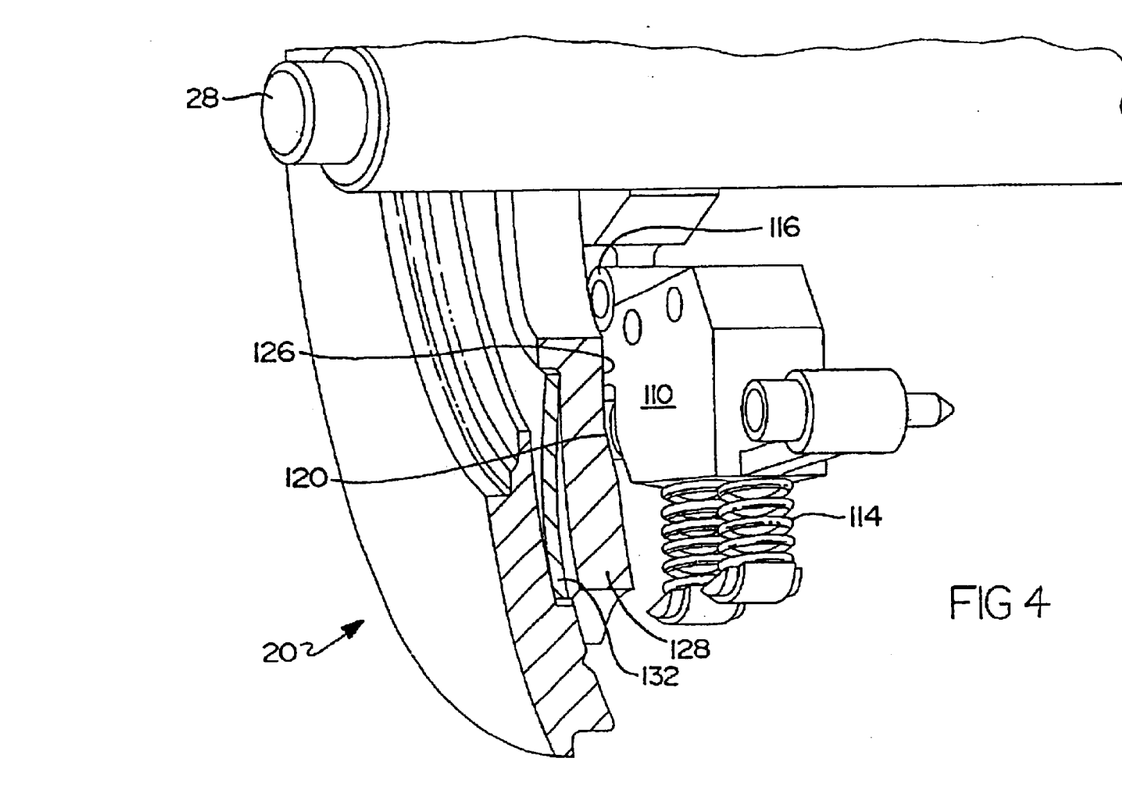
FIG. 4 is a partial sectional view of a roller, ramp, and clamp force limiting spring mechanism utilized with the centrifugal mechanism of FIG. 3.
Figure 5A:
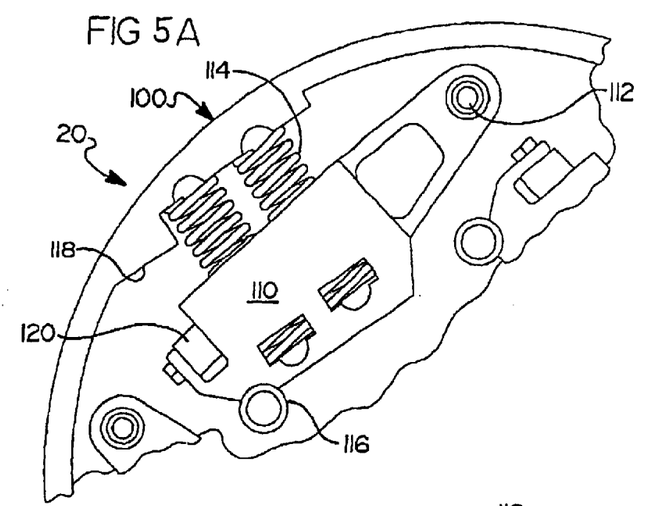
FIGS. 5A and 5B are partial sectional views of FIG. 3 illustrating the position of the flyweights in the fully radially inward clutch disengaged position and the fully radially outward clutch fully engaged position, respectively.
Figure 5B:
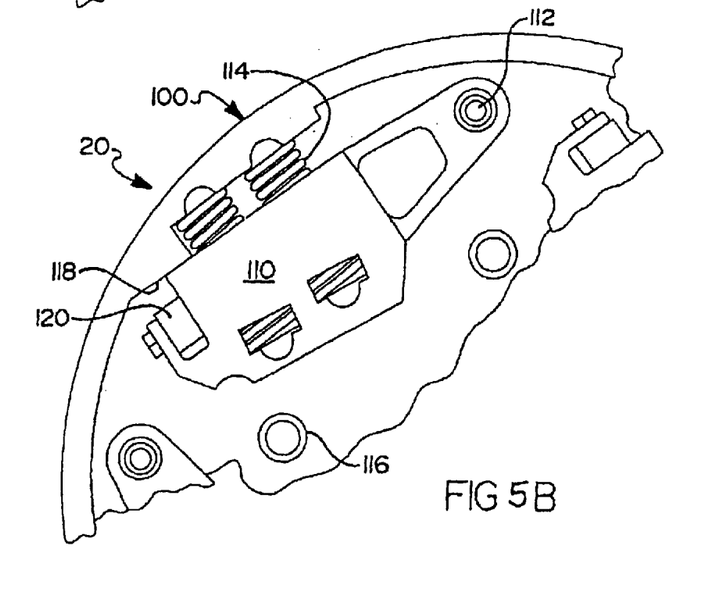

At rest, one of the rollers 120 will engage the recessed portion 146 of surface 126 and will not apply a leftward axial clamping force to the friction pads. As the roller travels sufficiently radially outwardly, and onto the ramped portion 148 of the ramp surface 126, an increasing axial clamping force is applied (see, e.g., line 70 on FIG. 2). As the roller moves further radially outwardly onto the flat extended portion of 150 of surface 126, the clamp force will remain at a capped value (see, e.g., lines 74 and 76 of FIG. 2) as limited by preload spring 132. The flyweights 110 will hit stops 118 prior to full compression of springs 132.

A greater centrifugal force 152 is required to move rollers 120 up ramp portion 148 to flat portion 150 than is required to retain the rollers on the flat portion against the effect of spring force 154 from return springs 114. This accounts for the difference between the initial maximum clamp force engine RPM value, point 72 on FIG. 2, and the release engine RPM value (e.g. point 78 in FIG. 2). Back tapers and/or recesses may be added to surface 150 and/or the inclination of ramp 148 and/or flat portion 150, the relative masses and/or the spring rate of spring 114 may be modified to change the engine speed of disengagement.

As the speed of engine 18 significantly decreases, rollers travel radially inwardly down ramp portion 148 as flyweights pivot back into engagement with stops 116. When the engine approaches its idle speed, the clutch 20 is fully disengaged. During operation of the vehicle, clutch 20 will typically disengage when the vehicle comes to rest, such as when the vehicle is stopped at an intersection. As the vehicle slows toward rest, transmission 12 may be shifted into neutral in anticipation of engaging a low gear ratio, such as the starting gear ratio, in what is commonly referred to as a "coast mode" of operation. Vehicular transmission system 10 may also be configured to automatically shift the transmission from neutral into a low gear ratio, including for example, the starting gear ratio, as the vehicle approaches rest during the "coast mode" of operation. Therefore, during the "coast mode" of operation, the vehicle and engine speed will decrease when the vehicle operator lets off the throttle pedal, allowing the clutch to disengage and the transmission 12 to be shifted from neutral into a low gear ratio in anticipation of re-launching the vehicle.

However, failure of clutch 20 to disengage as the engine speed decreases permits engine 18 to transfer power through clutch 20 and into transmission 12 after the transmission is shifted from neutral into the low gear ratio. Clutch 20 may fail to disengage for several reasons, including without limitation, damage of a clutch component that renders the centrifugal mechanism inoperable and failure of the engine speed to decrease below the release engine RPM value (e.g. point 78 in FIG. 2). Under these circumstances, the vehicle operator may notice the engine begin to pull against the application of the vehicle service brakes as the vehicle is slowed. With increased brake application, the engine torque may disengage the clutch or stall the engine as the vehicle slows toward rest. Among other features, the present invention prohibits shifting of the transmission into a low gear ratio if, during the "coast mode" of operation, the clutch has failed to disengage.

Figure 7A:
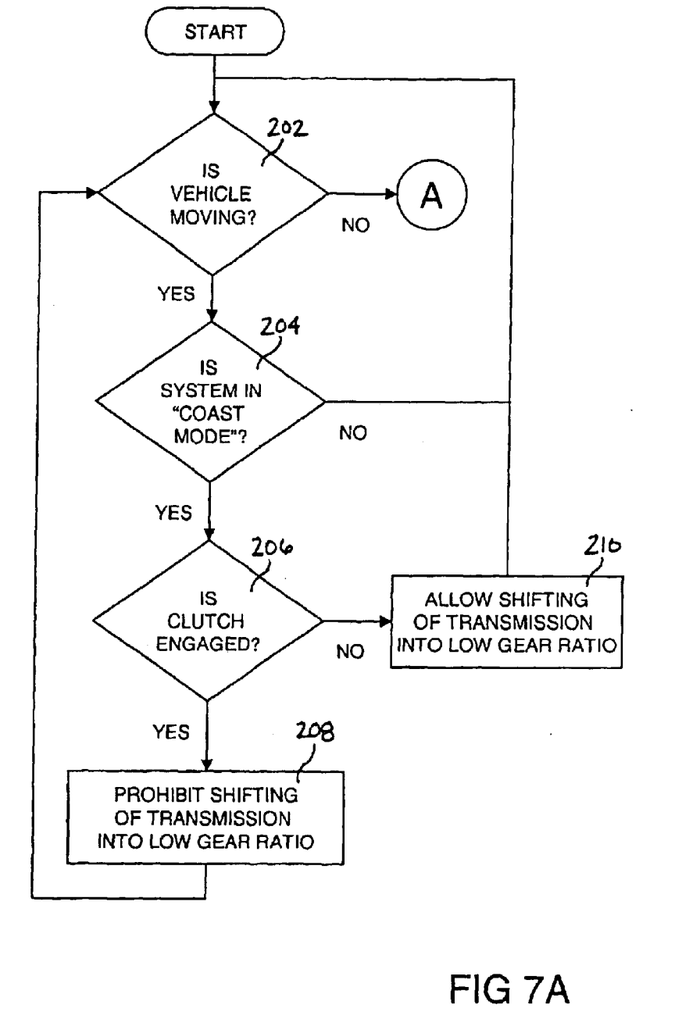
FIGS. 7A and 7B are schematic illustrations, in flowchart format, of an embodiment of control logic employed by a control system to determine whether the transmission may be shifted into a low gear ratio during operation of the exemplary vehicular transmission system.
Figure 7B:
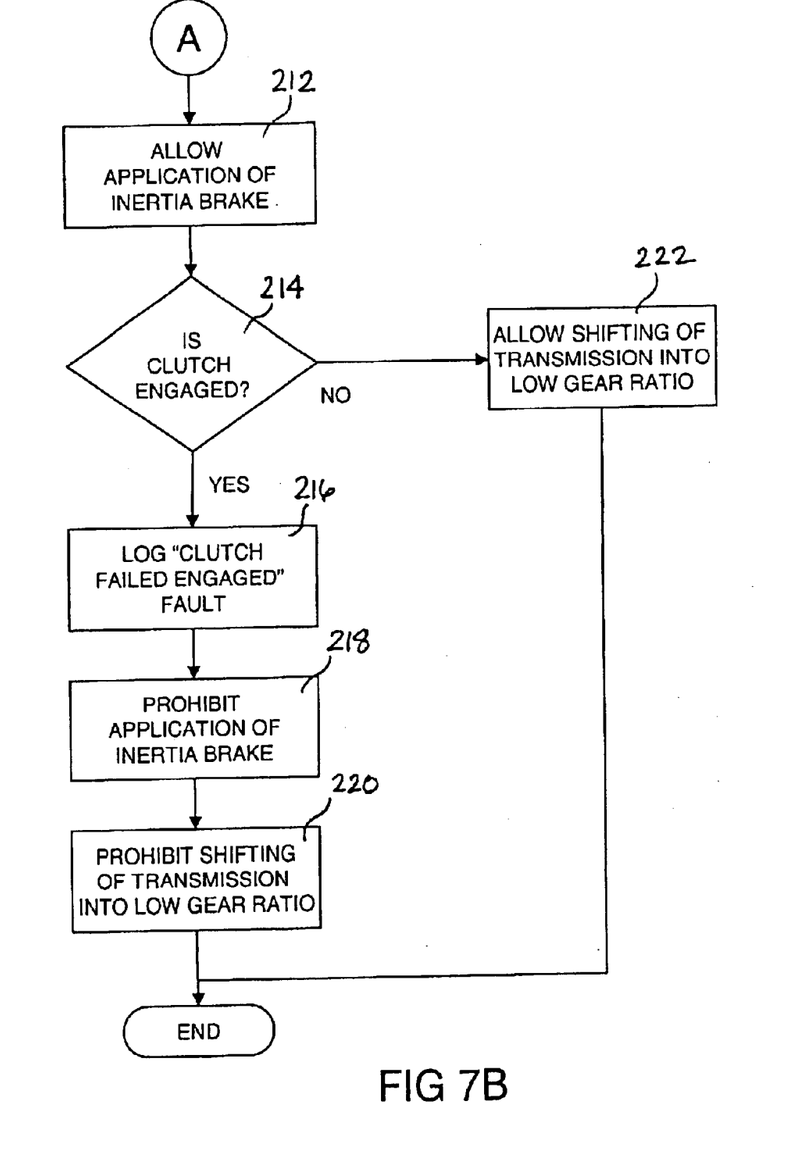

System ECU 50, either alone or in combination with engine ECU 44 and transmission ECU 46, has stored therein logic rules that control operation of system 10 during the "coast mode." Referring to FIGS. 7A and 7B, control logic and a method for controlling system 10 according to an embodiment of the invention are schematically illustrated in flowchart format. The control logic represented in FIGS. 7A and 7B can be embedded in system ECU 50 and/or transmission ECU 46 and executed at a predetermine time or throughout operation of vehicular transmission system 10.

Referring to FIG. 7A, system ECU 50, either alone or in combination with engine ECU 44 and transmission ECU 46, determines whether the vehicle is moving (202) and whether system 10 is in the "coast mode" (204). Various approaches may be used to determine whether the vehicle is moving, including without limitation, sensing output shaft rotational speed (OS). Similarly, whether system 10 is operating in the "coast mode" may also be determined by sensing output shaft rotational speed (OS); however, other means may be used, including by way of example, sensing engine rotational speed (ES), throttle position THL and transmission shift status, either alone or in combination. If the vehicle is moving in the "coast mode" of operation, a determination is also made as to whether clutch 20 is engaged or disengaged (206). This determination can be made, for example, by evaluating the difference between the engine rotational speed (ES) and input shaft rotational speed (IS), but is not necessarily limited thereto.

The order in which the above defined control logic steps are executed is not intended to be limited to the order illustrated in FIG. 7A. Similarly, one or more control logic steps could be consolidated into a single step or implied from another step. For example, the step of determining whether the vehicle is moving could be executed with the step of determining whether the system is operating in the "coast mode." In another example, a determination that the vehicle is moving may be implied if the vehicle is operating in the "coast mode."

Referring still to FIG. 7A, if it is determined that the vehicle is operating in the "coast mode" and the clutch is engaged (or not disengaged), then the transmission 12 is prohibited from shifting into a low gear ratio (208) and the vehicle coasts to a stop or is braked with the transmission 12 in neutral. If, however, the clutch is disengaged (or not engaged), then the transmission may be shifted into a low gear ratio (210), including without limitation, the starting gear ratio, in anticipation of re-launching the vehicle.

Therefore, the control logic, in accord with the method illustrated in the flow chart of FIG. 7A, prohibits shifting of the transmission 12 into a low gear ratio during the "coast mode" of operation if the following conditions are present:

VEHICLE MOVING=TRUE; AND
SYSTEM IN "COAST MODE"=TRUE; AND
CLUTCH ENGAGED=TRUE (or CLUTCH DISENGAGED=FALSE)

Referring to FIG. 7B, if the vehicle is at rest, system ECU 50 will allow application of inertia brake 31 (212) and will execute common fault-checking procedures to facilitate determination of the engagement status of clutch 20 or otherwise determine if clutch 20 is engaged or disengaged (214). If clutch 20 remains engaged (or is not disengaged), even while the engine speed is at idle, system ECU 50 will log a "clutch failed engaged" or comparable fault code into a memory (216) and will prohibit the application of inertia brake (218) and shifting of transmission 12 into a low gear ratio (220). Optionally, if the clutch 20 fails to disengage, the driver may be appropriately notified of the vehicle's inoperability, such as by illuminating a service light in the vehicle instrument panel or conveying other suitable messages to the driver. However, if clutch 20 is disengaged (or not engaged), system 50 will permit shifting of the transmission into a low gear ratio (222), including the starting gear ratio, to launch the vehicle.

While the control logic is described above as controlling operation of the transmission during the "coast mode," it will be appreciated that the basic structure of the logic may be applied to other modes of operation. In such a mode of operation, the transmission may be prohibited from shifting into a lower gear ratio, not necessarily a "starting" gear ratio or other gear ratio suitable for launching the vehicle.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular transmission system comprising a prime mover, a transmission having at least one mode of operation where the transmission is selectively shifted into a lower gear ratio as vehicle speed decreases, a master friction clutch for drivingly connecting the prime mover to the transmission, and at least one control unit for receiving an input and processing the input according to logic rules to issue an output to system components including at least the transmission, the system further characterized by:

the master friction clutch being a centrifugally operated clutch;

the control unit, in the at least one mode of operation, selectively prohibits the transmission from being shifted into a lower gear ratio;

at least one input corresponding to a system operating condition;

the control unit including logic rules that control operation of the transmission in response to the system operating condition; and at least one output corresponding to a specific priority command to prohibit the transmission from being shifted into any lower gear ratio in response to the system operating condition.

2. The system of claim 1, wherein the at least one mode of operation is a coast mode.

3. The system of claim 1, wherein the system operating condition is vehicle speed.

4. The system of claim 1, wherein said control unit further includes logic rules that:

determine if the vehicle is moving;

determine if the vehicle is in the at least one mode of operation; and prohibit the transmission from being shifted into a lower gear ratio if the vehicle is moving, the vehicle is in the at least one mode of operation and the master friction clutch is engaged.

5. The system of claim 1 further including logic rules that:

determine if the vehicle is moving; and prohibit the transmission from being shifted into a lower gear ratio if the vehicle is not moving and the master friction clutch is engaged.

6. The system of claim 1, wherein the clutch includes a driving member rotatable with an engine output member and a driven member rotatable with the input shaft, the clutch having a degree of engagement dependent upon the rotational speed of the driving member, the clutch being disengaged at engine idle speed, the clutch becoming incipiently engaged at an incipient engagement engine speed greater than the engine idle speed.

7. A control system for use in a vehicular transmission system including a prime mover, a transmission having at least one mode of operation where the transmission is shifted into a low gear ratio as vehicle speed decreases, and a master friction clutch drivingly connecting the prime mover to the transmission, the control system including logic rules that:

determine whether the master friction clutch is engaged or disengaged during the at least one mode of operation; and prohibit the transmission from being shifted into a low gear ratio when the master friction clutch is engaged.

8. The control system of claim 7 further including logic rules that:

determine if the vehicle is moving;

determine if the vehicle is in the at least one mode of operation; and prohibit the transmission from being shifted into a low gear ratio if the vehicle is moving, the vehicle is in the coast mode and the master friction clutch is engaged.

9. The control system of claim 7 further including logic rules that:

determine if the vehicle is moving; and prohibit the transmission from being shifted into a low gear ratio if the vehicle is not moving and the master friction clutch is engaged.

10. A method for operating a vehicular transmission system including a prime mover, a transmission having at least one mode of operation where the transmission is selectively shifted into a lower gear ratio as vehicle speed decreases, and a master friction clutch for drivingly connecting the prime mover to the transmission, the method comprising the steps of:

determining whether the master friction clutch is engaged or disengaged during the at least one mode of operation of the transmission; and prohibiting shifting of the transmission into a lower gear ratio if the friction clutch is engaged.

11. The method of claim 10, wherein the at least one mode of operation is a coast mode.

12. The method of claim 10 further including the steps of:

determining if the vehicle is moving;

determining if the vehicle is in the at least one mode of operation; and prohibiting shifting of the transmission into a lower gear ratio if the vehicle is moving, the vehicle is in the at least one mode of operation and the master friction clutch is engaged.

13. The method of claim 10 further including the steps of:

determining if the vehicle is moving;

prohibiting shifting of the transmission into a lower gear ratio if the vehicle is not moving and the master friction clutch is engaged.

14. A vehicular transmission system comprising a prime mover, a transmission having at least one mode of operation where the transmission is selectively shifted into a lower gear ratio as vehicle speed decreases, a master friction clutch for drivingly connecting the prime mover to the transmission, and at least one control unit for receiving an input and processing the input according to logic rules to issue an output to system components including at least the transmission, the system further characterized by:

the master friction clutch being a centrifugally operated clutch;

the control unit, in the at least one mode of operation, selectively prohibits the transmission from being shifted into a lower gear ratio;

at least one input corresponding to a system operating condition, wherein the system operating condition is clutch engagement status;

the control unit including logic rules that control operation of the transmission in response to the system operating condition; and at least one output corresponding to a command to prohibit the transmission from being shifted into a lower gear ratio in response to the system operating condition.

15. A vehicular transmission system comprising a prime mover, a transmission having at least one mode of operation where the transmission is selectively shifted into a lower gear ratio as vehicle speed decreases, a master friction clutch for drivingly connecting the prime mover to the transmission, and at least one control unit for receiving an input and processing the input according to logic rules to issue an output to system components including at least the transmission, the system further characterized by:

the master friction clutch being a centrifugally operated clutch;

the control unit, in the at least one mode of operation, selectively prohibits the transmission from being shifted into a lower gear ratio;

at least one input corresponding to a system operating condition;

the control unit including logic rules that control operation of the transmission in response to the system operating condition; and at least one output corresponding to a command to prohibit the transmission from being shifted into a lower gear ratio in response to the system operating condition;

wherein the control unit includes logic rules that determine whether the master friction clutch is engaged or disengaged during the at least one mode of operation and issue a command output that prohibits the transmission from being shifted into a low gear ratio if the master friction clutch is engaged.

* * * * *